Patented Sept. 5, 1950

2,521,425

UNITED STATES PATENT OFFICE 2,521,425

STABILIZATION OF PHENYLENE DIAMINES AND AMINOPHENOLS WITH AMINE-SULFUR DIOXIDE REACTION PRODUCTS

Ralph B. Thompson, Riverside, Ill., assignor to Universal Oil Products Company, Chicago, Ill., a corporation of Delaware No Drawing. Application February 13, 1948, Serial No. 8,301

19 Claims. (Cl. 260—577)

This invention relates to the stabilization of amino compounds and more particularly to the stabilization of aryl amino compounds comprising phenylene diamines and/or aminophenols.

Phenylene diamines and aminophenols are particularly suitable for use as gum inhibitors in organic compounds and more particularly in unsaturated gasolines which undergo deterioration due to oxygen. These inhibitors are generally added to gasoline in amounts of from about 0.0001% to about 0.01% by weight, the exact amount depending upon the particular gasoline being treated. The inhibitor also may be utilized in addition to various dyes, antiknock agents, such as tetraethyl lead, metal deactivators, or other additives employed for specific purposes.

Phenylene diamines as, for example, N,N'-di-sec-butyl-para-phenylene diamine, are very effective inhibitors for gasoline but have the disadvantages that, upon standing for an extended period of time, they tend to darken and thereby to impart undesirable color to gasoline. In some cases, it is desired to market a water-white gasoline and discoloration thereof due to the inhibitor is objectionable. In other cases, discoloration may cause confusion in identification of the gasoline. Many refiners identify their gasoline by color, and discoloration of a red gasoline to purple, for example, may cause confusion in this regard. Similarly, aminophenols, as, for example, N-butyl-para-aminophenol, are very effective gum inhibitors but also tend to discolor upon standing.

One method of preventing discoloration of the inhibitor is to maintain a blanket of an inert gas, such as nitrogen, over the inhibitor during storage, but this is objectionable because of the added expense and care required. The present invention offers a novel and readily available method for preventing discoloration of these inhibitors, which method comprises the addition of a particular class of compounds which have been found to be effective in preventing the discoloration.

In one embodiment the present invention relates to a method of stabilizing an aryl amino compound selected from the group consisting of a phenylene diamine and an aminophenol, which comprises adding thereto a stabilizing amount of the reaction product of sulfur dioxide and an organic amine.

Of the phenylene diamines, N,N'-di-sec-alkyl-para-phenylene diamines are generally the most effective as gum inhibitors in organic compounds which tend to deteriorate due to oxygen, and N,N'-di-sec-butyl-para-phenylene diamine is a preferred inhibitor. Other satisfactory inhibitors include N,N'-di-iso-propyl-para-phenylene diamine, N-isopropyl-N'-sec-butyl-para-phenylene diamine, N,N'-di-sec-amyl-para-phenylene diamine and various other phenylene diamines in which the substituent groups are the same or different.

Of the aminophenol inhibitors, N-normal-butyl-para-aminophenol is preferred, although other satisfactory inhibitors for gasoline include N-isopropyl-para-aminophenol, N-sec-amyl-para-aminophenol, as well as other alkyl, aryl, or aralkyl substituted aminophenols.

In accordance with the present invention, discoloration of aryl amino compounds is retarded or prevented by adding thereto a small amount of the reaction product of sulfur dioxide and an organic amine. Any suitable organic amine may be used for reaction with sulfur dioxide. The organic amine preferably contains at least three carbon atoms so that the reaction product with sulfur dioxide is readily soluble in the aryl amino inhibitors and also in the substrate to which the aryl amino inhibitor is subsequently added. In general, any aliphatic amine may be used for reaction with sulfur dioxide and thus includes such amines as n-propyl amine, isopropyl amine, n-butyl amine, isobutyl amine, sec-butyl amine, amyl amine, hexyl amine, heptyl amine, octyl amine, 2-ethylhexyl amine, decyl amine, dimethyl amine, diethyl amine, dipropyl amine, dibutyl amine, methyl ethyl amine, methyl propyl amine, methyl butyl amine, ethyl propyl amine, ethyl butyl amine, etc., ethylene diamine, propylene diamine, butylene diamine, diethylene triamine, dipropylene triamine, etc. Primary and secondary aliphatic amines are generally preferred because they are ordinarily stronger bases than the tertiary amines. In general, aromatic amines may be used but are not as satisfactory because they are too weakly basic to form good salts. Aromatic amines of this class include such compounds as aniline, phenylene diamine, toluidine, xylidine, mesidine, etc.

Another class of amines which are particularly suitable for use in the present invention include heterocyclic ring compounds comprising carbon and nitrogen atoms. A particularly suitable amine of this class for reaction with sulfur dioxide is piperidine. Other satisfactory but not necessarily equivalent heterocyclic compounds include pyridine, pyrrol, pyrazole, pyrrolidine, pyrazole, picoline, lutidine, and various homologs and isomers thereof.

The reaction of sulfur dioxide with the amine is readily effected by merely mixing sulfur dioxide with the desired amine. This reaction is generally effected at room temperature, although elevated temperatures which generally will not be in excess of about 200° F. may be employed when desired. When higher temperatures are employed, sufficient pressure should be utilized in order to maintain the amine in liquid phase.

In one embodiment of the invention, the reaction of sulfur dioxide and amine may be effected in an anhydrous state. In another embodiment of the invention, the reaction may be effected in the presence of water, the water being present in the stoichiometric proportions to react with $SO_2$ to form $H_2SO_3$. The resulting product will comprise the corresponding amine sulfite or amine bisulfite depending upon the quantity of amine employed. In still another embodiment the reaction may be effected in the presence of anhydrous alcohol and the resulting products will comprise the corresponding amine salts of the monoalkyl sulfite acid ester depending upon the particular amine employed. In view of the fact that sulfur dioxide tends to become oxidized, in another embodiment of the invention it may be desirable to add a small amount of metal deactivator to the reaction mixture in order to prevent oxidation of sulfur dioxide and also to prevent oxidation of the reaction product until it is ready for use. The amount of metal deactivator to be employed will be very small and, in general, will be less than 10 mol per cent based on the sulfur dioxide. Any suitable metal deactivator may be employed including such compounds as o-(salicylalamino)-phenols, di-(salicylalamino)-alkanes, salicylaldoxime, etc.

The reaction product of sulfur dioxide with amine is generally added to the aryl amino compound in an amount of from about 0.01% to about 5% by weight of the aryl amino compound and preferably in an amount of from about 0.05% to about 1% by weight.

The reaction product is preferably added to the aryl amino compound as soon as practical following preparation of the aryl amino compound and thus will serve to prevent discoloration and other deterioration of the aryl amino compound during storage and transportation.

In some cases, it may be desirable to store and/or transport the inhibitor in the form of a solution of the acid salt as, for example, the hydrochloride salt of p-phenylene diamine. While these acid salts are generally more color stable than p-phenylene diamine, they may become discolored after long periods of time and it is within the scope of the present invention to utilize the reaction product to retard or prevent this discoloration.

The following examples are introduced to illustrate further the novelty and utility of the present invention but not with the intention of unduly limiting the same.

The following examples illustrate the effectiveness of various reaction products prepared in accordance with the present invention when added to a gum inhibitor comprising N-N'-di-sec-butyl-p-phenylene diamine. 0.5% by weight of the reaction product was added to different samples of the gum inhibitor, and these samples, as well as another sample of the gum inhibitor without added reaction product, were exposed to the atmosphere and were periodically examined to determine their N. P. A. color. The results reported in the following examples are given as the number of hours required for the inhibitor to reach a color of 8 as determined in a Union colorimeter. The initial color of the samples was about 4.

*Example I*

A color stabilizer comprising the reaction product of sulfur dioxide and piperidine was prepared by reacting 1 mol of sulfur dioxide with 2 mols of piperidine in the presence of a small quantity of disalicylal propylene diamine.

The sample of inhibitor without added reaction product reached a color of 8 in less than 21 hours, whereas the sample of inhibitor containing the reaction product of sulfur dioxide and piperidine had reached a color of only 7½ after 216 hours. The test was discontinued after 216 hours because the results are more than adequate for all practical purposes.

*Example II*

Another color stabilizer was prepared by reacting 1 mol of sulfur dioxide with 2 mols of di-n-propyl amine. This reaction product, when added to another sample of the same gum inhibitor used in Example I, did not reach a color of 8 until after about 165 hours.

*Example III*

Another color stabilizer was prepared by reacting 1 mol of sulfur dioxide, 2 mols of piperidine and 1 mol of water. In a concentration of 2% by weight, this reaction product retarded discoloration of another sample of the gum inhibitor described in Example I to the extent that it reached only an N. P. A. color of 7 after 190 hours, at which time this particular test was discontinued.

*Example IV*

Still another color stabilizer was made by reacting 1 mol of sulfur dioxide, 1 mol of piperidine and 1 mol of ethanol. The reaction product is effective in retarding discoloration of the gum inhibitor described in Example I.

*Example V*

In order to show that the metal deactivator was not effective in retarding discoloration of the gum inhibitor and therefore was not responsible, at least in part, for the results obtained, another test was made by adding disalicylal propylene diamine to another sample of the gum inhibitor described in Example I. This sample reached a color of 8 in less than 21 hours, which result is the same as obtained in the test sample which did not contain added color stabilizer.

I claim as my invention:

1. A method of stabilizing an aryl amino compound selected from the group consisting of phenylene diamines and aminophenols which comprises adding thereto from about 0.01% to about 5% by weight of the reaction product of sulfur dioxide with an organic amine containing at least three carbon atoms and consisting of carbon, hydrogen and nitrogen.

2. A method of preventing discoloration of a phenylene diamine which comprises adding thereto from about 0.01% to about 5% by weight of the reaction product of sulfur dioxide with an organic amine containing at least three carbon atoms and consisting of carbon, hydrogen and nitrogen.

3. A method of stabilizing N,N'-di-alkyl-p-phenylene diamine which comprises adding thereto from about 0.01% to about 5% by weight of the reaction product of sulfur dioxide with an aliphatic amine containing at least three carbon atoms and consisting of carbon, hydrogen and nitrogen.

4. A method of stabilizing N,N'-di-sec-butyl-p-phenylene diamine which comprises adding thereto from about 0.1% to about 5% by weight of the reaction product of sulfur dioxide with an organic amine containing at least three carbon atoms and consisting of carbon, hydrogen and nitrogen.

5. The method of claim 4 further characterized in that said organic amine is an aliphatic amine.

6. The method of claim 4 further characterized in that said amine is a primary aliphatic amine.

7. The method of claim 4 further characterized in that said amine is a secondary aliphatic amine.

8. The method of claim 4 further characterized in that said amine is a heterocyclic ring compound comprising carbon and nitrogen atoms.

9. A method of preventing discoloration of an amino phenol which comprises adding thereto from about 0.01% to about 5% by weight of the reaction product of sulfur dioxide with an organic amine containing at least three carbon atoms and consisting of carbon, hydrogen and nitrogen.

10. A method of stabilizing N-n-butyl-p-amino-phenol which comprises adding thereto from about 0.01% to about 5% by weight of the reaction product of sulfur dioxide with an aliphatic amine containing at least three carbon atoms and consisting of carbon, hydrogen and nitrogen.

11. A method of preventing discoloration of an amino-phenol which comprises adding thereto from about 0.01% to about 5% by weight of a reaction product of sulfur dioxide with piperidine.

12. An aryl amino compound selected from the group consisting of phenylene diamines and aminophenols containing from about 0.01% to about 5% by weight of the reaction product of sulfur dioxide with an organic amine containing at least three carbon atoms and consisting of carbon, hydrogen and nitrogen.

13. N,N' - di - sec - butyl-p-phenylene diamine containing from about 0.01% to about 5% by weight of the reaction product of sulfur dioxide with a primary aliphatic amine containing at least three carbon atoms and consisting of carbon, hydrogen and nitrogen.

14. N,N' - di - sec - butyl-p-phenylene diamine containing from about 0.01% to about 5% by weight of the reaction product of sulfur dioxide with a secondary aliphatic amine containing at least three carbon atoms and consisting of carbon, hydrogen and nitrogen.

15. N,N' - di - sec - butyl-p-phenylene diamine containing from about 0.01% to about 5% by weight of the reaction product of sulfur dioxide with piperidine.

16. An N - alkyl - p - aminophenol containing from about 0.01% to about 5% by weight of the reaction product of sulfur dioxide with an aliphatic amine containing at least three carbon atoms and consisting of carbon, hydrogen and nitrogen.

17. N-n-butyl-p-aminophenol containing from about 0.01% to about 5% by weight of the reaction product of sulfur dioxide with a primary aliphatic amine containing at least three carbon atoms and consisting of carbon, hydrogen and nitrogen.

18. N-n-butyl-p-aminophenol containing from about 0.01% to about 5% by weight of the reaction product of sulfur dioxide with a secondary aliphatic amine containing at least three carbon atoms and consisting of carbon, hydrogen and nitrogen.

19. N-n-butyl-p-aminophenol containing from about 0.01% to about 5% by weight of the reaction product of sulfur dioxide with piperidine.

RALPH B. THOMPSON.

REFERENCES CITED

The following references are of record in the file of this patent:

UNITED STATES PATENTS

| Number | Name | Date |
| --- | --- | --- |
| 1,726,252 | Wolffenstein | Aug. 27, 1929 |
| 2,009,757 | Bentley et al. | July 30, 1935 |
| 2,381,257 | Campbell et al. | Aug. 7, 1945 |

OTHER REFERENCES

Postnikov et al., Chemical Abstracts, vol. 34, page 6777$^8$ (1940).